United States Patent [19]

Knapen

[11] Patent Number: 4,644,246

[45] Date of Patent: Feb. 17, 1987

[54] ELECTRIC POWER SUPPLY SYSTEM FOR PORTABLE MINIATURE SIZE POWER CONSUMING DEVICES

[75] Inventor: Petrus M. J. Knapen, Tilburg, Netherlands

[73] Assignee: Kinetron B. V., Tilburg, Netherlands

[21] Appl. No.: 746,179

[22] Filed: Jun. 18, 1985

[30] Foreign Application Priority Data

Jul. 3, 1984 [NL] Netherlands ............... 8402113

[51] Int. Cl.[4] ............... H01M 10/46; G04C 10/00; H02K 21/14
[52] U.S. Cl. ............... 320/21; 368/64; 368/179; 368/204; 322/10; 310/75 A; 310/156
[58] Field of Search ............... 320/2, 21, 41, 42, 61; 368/64, 163, 179, 180, 183, 203, 204; 310/75 R, 75 A, 156; 322/1, 3, 4, 10

[56] References Cited

U.S. PATENT DOCUMENTS

| | | | |
|---|---|---|---|
| 2,791,732 | 5/1957 | Jones | 368/163 X |
| 3,005,305 | 10/1961 | Thoma | 368/163 X |
| 4,008,566 | 2/1977 | McClintock | 320/21 X |
| 4,091,302 | 5/1978 | Yamashita | 368/204 X |

FOREIGN PATENT DOCUMENTS 13473  2/1978  Japan ............... 368/64

*Primary Examiner*—William B. Perkey
*Attorney, Agent, or Firm*—Fay, Sharpe, Fagan, Minnich & McKee

[57] ABSTRACT

An electric power supply system for portable miniature size power consuming devices, comprising an AC generator, a rechargeable battery and a charging device to be fed from the AC generator and maintaining the battery charging level, the AC generator comprising a multi-polar rotor wheel having permanently magnetized poles, a stator having one or more windings providing the AC current and an eccentric mass driving the permanently magnetized rotor wheel; the rotor wheel, the stator and the eccentric mass being mounted coaxially, a transmission being arranged between the eccentric mass and the rotor wheel. According to the invention the transmission is a loose coupling means to be tightened by magnetic fields between the poles of the rotor wheel and the respective poles of the stator.

12 Claims, 5 Drawing Figures

ELECTRIC POWER SUPPLY SYSTEM FOR PORTABLE MINIATURE SIZE POWER CONSUMING DEVICES

The invention relates to an electric power supply system for portable miniature size power consuming device comprising an AC generator, a rechargeable battery and a charging device to be fed from the AC generator and maintaining the battery charging level, the AC generator comprising a multi-polar rotor wheel having permanently magnetised poles, a stator having one or more windings providing the AC current, and an eccentric mass driving the permanently magnetised rotor wheel; the rotor wheel, the stator and the eccentric mass being mounted coaxially, a transmission being arranged between the eccentric mass and the rotor wheel.

A similar system is known from Japanese laid open patent application No. 52/68466 (1975). The known system is arranged as a power supply in a wrist watch. Wearing the watch causes movements of the eccentric mass. Charging the battery requires a charging voltage produced in the charging device by a rectifier and a voltage regulator, said charging voltage being determined by the electrochemical characteristics of the battery. In the charging device losses are unavoidable. Therefore, the terminal voltage of the generator must exceed the charging voltage in order to maintain the battery charging level. The AC generator terminal voltage is determined by its electromotive force (e.m.f.) of the AC generator which terminal voltage is proportional to the number of windings on the stator and the speed of the rotor wheel, by its internal resistance and by the load. The primary power source of this system is the kinetic energy of the eccentric mass when activated into oscillation by casual movements of the wearer or carrier of the miniature size power consuming device. Said oscillation is damped by the AC generator. In order to obtain from this process as much useful power for recharging the battery as possible, the said Japanese patent application proposes to couple the eccentric mass with the rotor wheel by a transmission in the form of an accelerating gear train. As a result the speed of the rotor wheel is always higher than the instantaneous speed of the eccentric mass. However, this proposal involves significant friction losses in the gear train and an enlargement of the moment of inertia of the eccentric mass. The latter acts adversely on the amplitude of the voltage peaks of the terminal voltage.

The object of the invention is to minimize power losses in the transmission.

Another object of the invention is to increase by means of the transmission the terminal voltage of the AC generator across the charging device.

Still another object of the invention is to put the kinetic energy collected in the eccentric mass to use effectively.

The invention is characterized in that the transmission is a loose coupling means to be tightened by magnetic fields between the poles of the rotor wheel and the respective poles of the stator.

The moment of adhesion generated by the magnetic fields between stator and rotor wheel maintains the rotor wheel in a predetermined idling position relative to the stator unless the eccentric mass provides the rotor wheel with a momentum (impulse) sufficient to move to a further idling position determined by the magnetic fields. The loose coupling permits the rotor wheel to lag behind the eccentric mass. Thus the rotor wheel is fired from one idling position to a further idling position whereby the rotor wheel achieves a relatively high speed and thus causes relatively high voltage peaks in the terminal voltage generated by the AC generator across the charging device.

In the preferred embodiments of the system according to the invention, the loose coupling is designed such that the mechanical losses in the transmission are greatly reduced.

In the following description the preferred embodiments and their characteristic features are described.

The description refers to a drawing.

Figure 1:
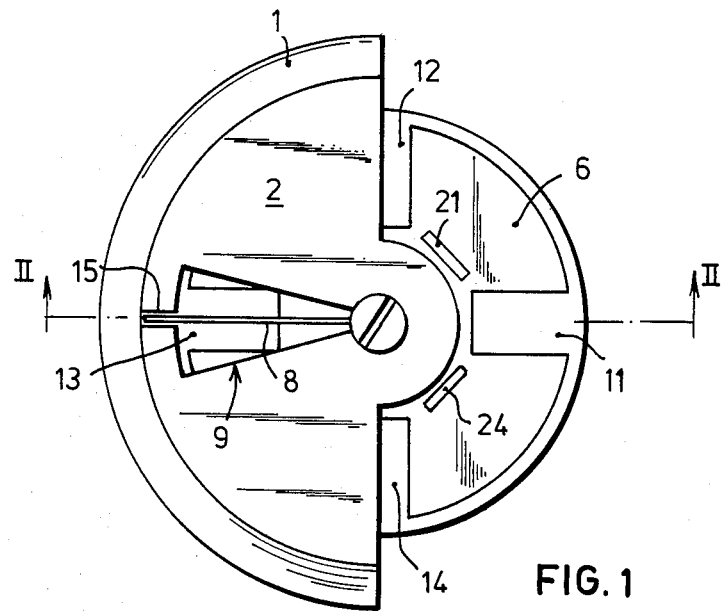
FIG. 1 shows diagrammatically a top view of a first preferred embodiment of an AC generator according to the invention.
Figure 2:
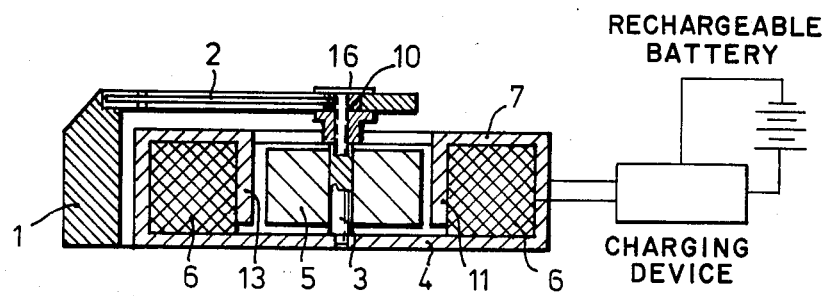
FIG. 2 shows a cross-section of the AC generator according to the line II—II in FIG. 1.

In FIG. 1 and FIG. 2 an eccentric mass shaped as a ring segment is freely rotatable by means of a rigid plate 2 shaped as a circle sector around a neck 10 and mounted under a screw head 16 on a shaft 3. The shaft 3 is located centrally and is rotatable in a stator construction 4. On the shaft 3 an assembly 5 comprising eight permanent magnets sectorially arranged over 360° is fixedly attached, thus forming a rotor wheel being rotatable in the stator construction 4. The stator construction 4 comprises a flat coil 6 and a soft-iron yoke 7 enclosing the coil 6 and forming eight claw poles 11, 12, 13 14; 21, 22, 23, 24 (22, 23 not shown).

The free rotation of the eccentric mass 1, 2 around the shaft 3 is constrained by a leaf spring 8 extending through an opening 9 in the plate 2 from the neck 10 into a notch 15 in the eccentric mass. Thus the leaf spring 8 is loosely received in the eccentric mass 1, the notch 15 having sufficient depth and the leaf spring having sufficient length to maintain the leaf spring 8 in the notch 15 even when bent.

The leaf spring accomplishes that the eccentric mass is moving the rotor wheel which tends to adhering to the stator poles, no sooner than when the leaf spring is bent to a certain degree. Thus while maintaining a continuous rotation of the eccentric mass and temporarily accumulating energy in the leaf spring derived from the rotation of the eccentric mass, the rotor wheel can be put intermittently into accelerated movement with the advantage that the intermittent rotor movements cause the generator to provide a relatively high electromotive force. This does not only mean that a sufficiently high electromotive force is generated to charge a battery, but also that a larger portion of the kinetic energy of the eccentric mass is applied usefully.

The leaf spring 8 is quite a simple, but effective embodiment of the spring member connecting the eccentric mass with the rotor.

The generator according to the embodiment is for example made up with an eccentric mass of 0.5 g and a radius of 4.8 mm, a spring-steel leaf spring with a length of 4.5 mm, a width of 0.2 mm and a thickness of 0.02 mm, and a coil having 1500 windings of copper wire with a diameter of 20 μm. Being worn at the wrist, the generator compensates a consumption of 1–3 μAh per hour for which a minimum terminal voltage of 1.8 V is provided.

A generator having the above dimensions together with the charging device and a battery can be accommodated in the space available in a conventional electric wrist watch for storing an accumulator only.

Figure 3:
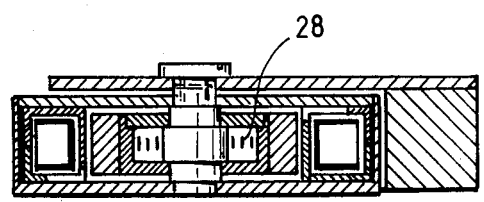
FIG. 3 shows a cross-section similar to FIG. 2 of a variant of the AC generator according to FIGS. 1 and 2.

FIG. 3 is a cross-section of a variant of the AC generator according to FIGS. 1 and 2. Its distinctive feature is that the spring member is a relatively compliant leaf spring 28 and that the engaging means hold the opposite terminal portion of the leaf spring in the inner rim of the eccentric mass thus enabling a running start of the eccentric mass before firing the rotor wheel.

Figure 4:
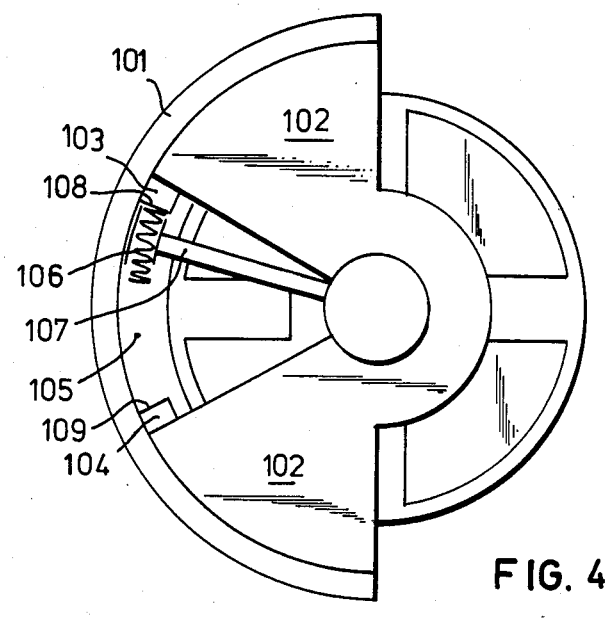
FIG. 4 shows diagrammatically a top view of a second preferred embodiment of an AC generator according to the invention.

FIG. 4 is a diagrammatic top view of a second embodiment of the AC generator. In an inner rim of the eccentric mass 1 or under the plate 202 a clearance 105 between two projections 103, 104 respectively, comprises a hammer head 106 mounted on a relatively rigid handle 107 which is fixedly attached in radial direction in the rotor wheel. The hammer head 106 is resilient in order to absorb a portion of the stroke energy when said hammer head is hitting a stop 108, 109 of a projection 103, 104 respectively, to prevent rebounding of the hammer head from the stop. The clearance 105 approximately covers the angular space between two successive magnet poles in the rotor wheel. Furthermore the AC generator is carried out as shown in FIG. 1 and FIG. 2.

Figure 5:
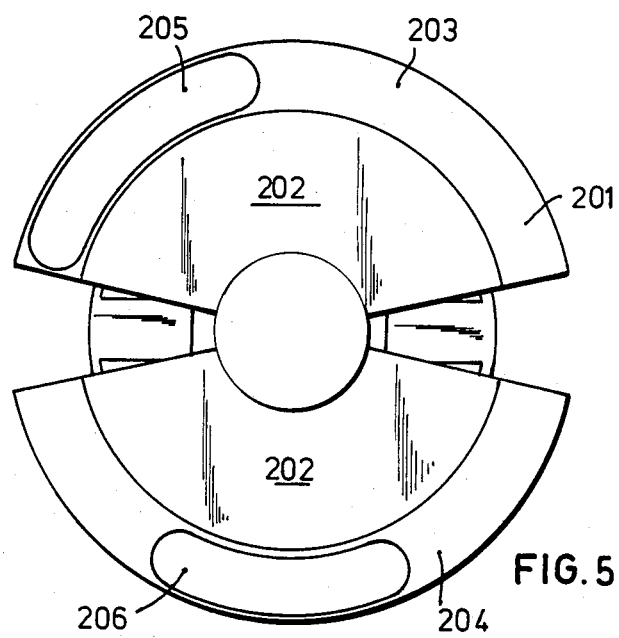
FIG. 5 shows diagrammatically a top view of a third preferred embodiment of an AC generator according to the invention.

FIG. 5 shows a diagrammatic top view of a third embodiment of the AC generator. At the edge of the plate 202 two sealed sections 203,204 of a torus-shaped ring 201 are mounted, each containing a drop 205, 206 respectively of a heavy liquid. These drops form the eccentric mass. The plate 202 is fixedly connected with the rotor wheel. The diameter of the rotor wheel is considerably less than the wheel. The diameter of the rotor wheel is considerably less than the diameter of the ring 201. A section covers at most about an angular space of 180° along the periphery of plate 202. In addition to liquid drops, marbles of a heavy material can also be applied for partially filling the sealed sections. Otherwise the AC generator is constructed a shown in FIG. 1 and FIG. 2.

The loose coupling between the eccentric mass and rotor wheel can also be achieved by means of a spring member being a relatively compliant leaf spring, the engaging means clamping the leaf spring in the inner rim of the eccentric mass. The said loose coupling permits the eccentric mass to accumulate a substantial momentum prior to delivering a portion thereof to the rotor wheel.

In all the embodiments the outer diameter of the rotor wheel is considerably less than the inner diameter of the excentric mass, so that the rotor wheel has a relatively small moment of inertia.

It is noted that a spring member, in particular the described leaf spring, has a relatively small inert mass as well as a small moment of inertia. These facts contribute to increasing the peak voltage provided by the generator and thus to making the most of the kinetic energy of the eccentric mass.

I claim:

1. An electric power supply system for portable miniature size power consuming devices, comprising an AC generator, a rechargeable battery and a charging device to be fed from the AC generator and maintaining the battery charging level, the AC generator comprising a multi-polar rotor wheel having permanently magnetized poles, a stator having one or more windings providing an AC current and an eccentric mass driving the permanently magnetized rotor wheel; the rotor wheel, the stator and the eecentric mass being mounted coaxially, a transmission being arranged between the eccentric mass and the rotor wheel characterized in that the transmission is a loose coupling means that selectively engages the rotor wheel by overcoming magnetic fields interacting between the poles of the rotor wheel and the respective poles of the stator, wherein the loose coupling means comprises a spring member, one terminal portion thereof being attached to the rotor wheel, the eccentric mass comprising means for engaging the opposite terminal portion of the spring member.

2. A system according to claim 1 characterized in that the stator poles are claw poles.

3. A system according to claim 1, characterized in that the engaging means comprise a pair of projections at an inner rim of the eccentric mass defining a clearance along said inner rim, and that the spring member is a relatively rigid leaf spring, its opposite terminal portion penetrating into the clearance.

4. A system according to claim 3, characterized in that the said clearance is only sufficient to permit a true elastic flexure of the leaf spring when overcoming a moment of adhesion being caused by the magnetic fields between the stator and the rotor wheel.

5. A system according to claim 3, characterized in that said clearance substantially comprises an angular space between two subsequent magnetic poles.

6. A system according to claim 5, characterized in that the relatively rigid leaf spring at the said opposite terminal portion comprises a hammer head.

7. A system according to claim 6, characterized in that the hammer head is resilient in both stroke directions.

8. A system according to claim 1, characterized in that the spring member is a relatively compliant leaf spring and that the engaging means hold the opposite terminal portion of the leaf spring in the inner rim of the eccentric mass.

9. An electric power supply system for portable miniature size power consuming devices, comprising an AC generator, a rechargeable battery and a charging device to be fed from the AC generator and maintaining the battery charging level, the AC generator comprising a multi-polar rotor wheel having permanently magnetized poles, a stator having one or more windings providing an AC current and an eccentric mass driving the permanently magnetized rotor wheel; the rotor wheel, the stator and the eccentric mass being mounted coaxially, a transmission being arranged between the eccentric mass and the rotor wheel characterized in that the transmission is a loose coupling means that selectively engages the rotor wheel by overcoming magnetic fields interacting between the poles of the rotor wheel and the respective poles of the stator, wherein the loose coupling means comprises a plate attached to the rotor wheel carrying along its periphery a torus-shaped tube divided into one or more sealed sections, the eccentric mass comprising an amount of material distributed over the tube sections, the volume of the distributed material in each tube section being considerably less than the volume of the respective tube section so as to be able to move within said tube section, such movement causing a lurching movement of said plate which, in turn, overcomes the magnetic fields interacting between the poles of the rotor and the poles of the stator to cause rotation of said rotor wheel until the poles of said rotor wheel against interact with the respective poles of said stator.

10. A system according to claim 9, characterized in that the material is a heavy liquid.

11. A system according to claim 9, characterized in that the material is globularly shaped.

12. A system according to claim 4, characterized in that the stator poles are claw poles.

* * * * *